US012592181B2

(12) United States Patent
Kim et al.

(10) Patent No.: US 12,592,181 B2

(45) Date of Patent: Mar. 31, 2026

(54) PIXEL CIRCUIT AND MICRO LED DISPLAY DEVICE INCLUDING THE SAME

(71) Applicant: LG Display Co., Ltd., Seoul (KR)

(72) Inventors: Jinyeong Kim, Goyang-si (KR); Wonjun Choi, Paju-si (KR); Hyunwoo Kim, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/810,152

(22) Filed: Aug. 20, 2024

(65) Prior Publication Data

US 2025/0201174 A1 Jun. 19, 2025

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01); *G09G 2320/0247* (2013.01)

(58) Field of Classification Search
CPC ............. G09G 3/32; G09G 2300/0819; G09G 2300/0852; G09G 2300/0861; G09G 2310/08; G09G 2320/0233; G09G 2320/0247
See application file for complete search history.

(56) References Cited

U.S. PATENT DOCUMENTS

| | | | | |
|---|---|---|---|---|
| 8,957,837 | B2 * | 2/2015 | Han | G09G 3/3233 345/76 |
| 10,004,124 | B1 * | 6/2018 | Ko | H05B 33/10 |
| 10,276,638 | B2 | 4/2019 | Park et al. | |
| 10,446,079 | B2 | 10/2019 | Ka et al. | |
| 11,107,400 | B2 | 8/2021 | Ka et al. | |
| 11,527,196 | B2 * | 12/2022 | Tseng | G09G 3/3233 |
| 11,996,041 | B2 | 5/2024 | Ka et al. | |
| 2017/0025062 | A1 * | 1/2017 | Wang | G09G 3/3233 |
| 2019/0096336 | A1 * | 3/2019 | Lee | G09G 3/3266 |
| 2019/0130832 | A1 * | 5/2019 | Chang | G09G 3/3266 |
| 2020/0152119 | A1 * | 5/2020 | Xuan | G09G 3/3233 |
| 2021/0201786 | A1 * | 7/2021 | Ma | G09G 3/3266 |
| 2021/0241695 | A1 * | 8/2021 | Xuan | G09G 3/32 |
| 2022/0223107 | A1 | 7/2022 | Chen et al. | |
| 2024/0312412 | A1 | 9/2024 | Ka et al. | |

FOREIGN PATENT DOCUMENTS

| | | | |
|---|---|---|---|
| KR | 20180078109 | A | 7/2018 |
| TW | 201833896 | A | 9/2018 |
| TW | 202338777 | A | 10/2023 |

* cited by examiner

*Primary Examiner* — David Tung

(74) *Attorney, Agent, or Firm* — Seed Intellectual Property Law Group LLP

(57) ABSTRACT

The present disclosure provides a pixel circuit that may output uniform driving current regardless of the process distribution of the micro-LED element and a micro-LED display device including the same. The pixel circuit includes a micro-LED; a driving transistor that controls the driving current of the micro-LED; a storage capacitor that samples a data voltage that determines the magnitude of the driving current; and an internal compensation circuit that directly resets a first node and a second node respectively corresponding to both opposing electrodes of the storage capacitor before the storage capacitor samples the data voltage.

18 Claims, 7 Drawing Sheets

PIXEL CIRCUIT AND MICRO LED DISPLAY DEVICE INCLUDING THE SAME

CROSS-REFERENCE TO RELATED APPLICATION

This application claims priority from Korean Patent Application No. 10-2023-0182767 filed on Dec. 15, 2023 in the Korean Intellectual Property Office, and all the benefits accruing therefrom under 35 U.S.C. 119, the contents of which in its entirety are herein incorporated by reference.

BACKGROUND

Technical Field

The present disclosure relates to a display device, and more specifically, to a pixel circuit and a micro-LED display device including the same.

Description of Related Art

A display device with a self-light-emitting element may be implemented to be thinner than a display device with a built-in light source, and may be able to implement a flexible and foldable display device.

The display device with the self-light-emitting element may include an organic light-emitting display device that includes a light-emitting layer made of an organic material and a micro-LED display device that uses a micro-LED element as a light-emitting element. The organic light-emitting display device or the micro-LED display device does not require a separate light source, and thus may be embodied into thinner or more diverse display devices.

However, the organic light-emitting display device using the organic material is prone to a defective pixel due to moisture and oxygen. Thus, various technical designs are additionally required to minimize penetration of oxygen and moisture.

Recently, research and development on a display device that uses the micro-LED element as the light-emitting element are in progress. This display device has high image quality and high reliability and thus is in the spotlight as a next-generation display device.

The micro-LED element is made of an inorganic material. Thus, high current may be injected thereto to achieve high luminance. The micro-LED element is less sensitive to environmental impact such as heat, moisture, and oxygen, thus making it highly reliable. Furthermore, influence of oxygen and moisture on the micro-LED element is minimal, so that there is no need for a separate encapsulation film. This may minimize a non-display area of the display device including the micro-LED element.

BRIEF SUMMARY

The present disclosure provides a pixel circuit that may output a uniform driving current regardless of the process distribution of the micro-LED element and a micro-LED display device including the same.

The present disclosure provides a pixel circuit that may remove luminance unevenness and flicker by applying a direct internal compensation circuit to reduce leakage current, and a micro-LED display device including the same.

Technical features according to the present disclosure are not limited to those above-mentioned. Other technical features and characteristics according to the present disclosure that are not mentioned may be understood based on following descriptions, and may be more clearly understood based on embodiments according to the present disclosure. Further, it will be easily understood that the technical features and characteristics according to the present disclosure may be realized using means shown in specification including the claims or combinations thereof.

One embodiment of the present disclosure provides a pixel circuit comprising: a micro-LED; a driving transistor configured to control a driving current of the micro-LED; a storage capacitor configured to sample a data voltage, wherein a magnitude of the driving current is based on the data voltage; and an internal compensation circuit configured to directly reset a first node and a second node respectively corresponding to both opposing electrodes of the storage capacitor before the storage capacitor samples the data voltage.

Another embodiment of the present disclosure provides a micro-LED display device comprising: at least one sub-pixel, wherein each of the at least one sub-pixel includes: a micro-LED; a driving transistor configured to control a driving current of the micro-LED; a storage capacitor configured to sample a data voltage, wherein a magnitude of the driving current is based on the data voltage; a first transistor configured to transmit the data voltage to the storage capacitor in response to a first scan signal; a second transistor configured to connect a gate electrode and a drain electrode of the driving transistor in response to the first scan signal; a first reset transistor configured to reset a first node between the gate electrode of the driving transistor and one of both opposing electrodes of the storage capacitor in response to a second scan signal; and a second reset transistor configured to reset a second node between the first transistor and the other of the both opposing electrodes of the storage capacitor in response to the second scan signal.

Still another embodiment of the present disclosure provides a micro-LED display device comprising: a micro-LED configured to emit light based on a driving current; a driving transistor configured to receive a power voltage and to control the driving current; a storage capacitor having one electrode corresponding to a first node and connected to a gate electrode of the driving transistor, and the other electrode corresponding to a second node and connected to a first transistor configured to transmit a data voltage, wherein the storage capacitor is configured to sample the data voltage; the first transistor configured to transmit the data voltage to the storage capacitor in response to a first scan signal; a second transistor configured to connect the gate electrode and a drain electrode of the driving transistor to each other in response to the first scan signal; a third transistor configured to transmit a reference voltage to the second node in response to a light-emission signal; a fourth transistor connected to and disposed between the driving transistor and the micro-LED, and configured to be turned on in response to the light-emission signal so as to activate a current path of the driving current to the driving transistor; a fifth transistor configured to transmit the reference voltage to the first node in response to a second scan signal; a sixth transistor configured to transmit the data voltage to the second node in response to the second scan signal; and a stabilization capacitor connected to and disposed between a source electrode and the gate electrode of the driving transistor.

Still further another embodiment of the present disclosure provides a pixel circuit comprising: a micro-LED; a driving transistor configured to control a driving current of the micro-LED; a storage capacitor configured to sample a data voltage, wherein a magnitude of the driving current is based on the data voltage; a first transistor configured to transmit the data voltage to the storage capacitor in response to a first scan signal; and an internal compensation circuit configured to simultaneously reset both opposing electrodes of the storage capacitor in response to a second scan signal, wherein an enable period of the first scan signal and an enable period of the second scan signal non-overlap each other.

According to embodiments of the present disclosure, a uniform driving current may be output regardless of the process distribution of the micro-LED.

Furthermore, according to embodiments of the present disclosure, the luminance unevenness and flicker problems may be removed by applying the direct reset compensation circuit to reduce the leakage current.

Effects of the present disclosure are not limited to the effects mentioned above, and other effects not mentioned will be clearly understood by those skilled in the art from the description as set forth below.

In addition to the above effects, specific effects of the present disclosure are described together while describing specific details for carrying out the present disclosure.

DETAILED DESCRIPTION

Figure 1:
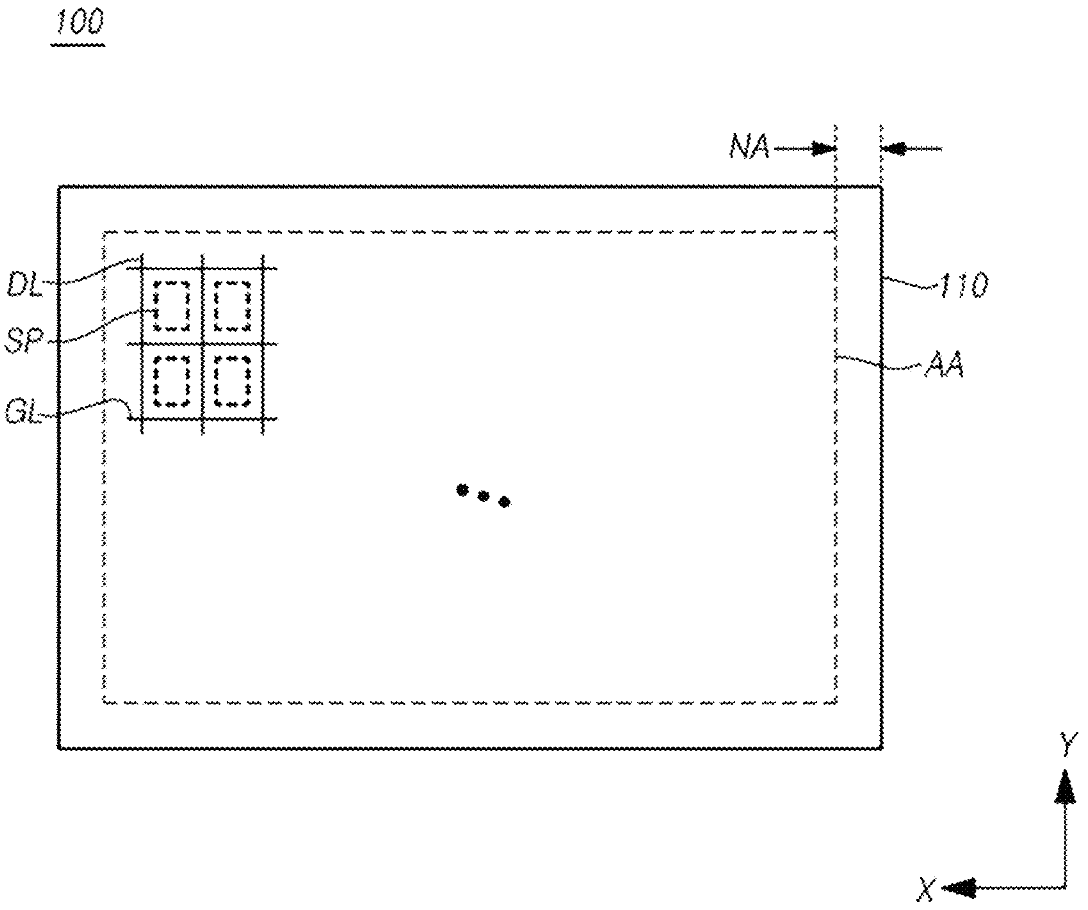
FIG. 1 is a schematic plan view of a micro-LED display device with a plurality of sub-pixels according to an embodiment of the present disclosure.

Advantages and features of the present disclosure, and a method of achieving the advantages and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure including the appended claims.

A shape, a size, a ratio, an angle, a number, etc., disclosed in the drawings for illustrating embodiments of the present disclosure are illustrative, and the present disclosure is not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "connected to" another element or layer, it may be directly on, combined to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In descriptions of temporal relationships, for example, temporal precedent relationships between two events such as "after", "subsequent to", "before", etc., another event may occur therebetween unless "directly after", "directly subsequent" or "directly before" is indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms “first”, “second”, “third”, and so on may be used herein to describe various elements, components, regions, layers and/or periods, these elements, components, regions, layers and/or periods should not be limited by these terms. These terms are used to distinguish one element, component, region, layer or section from another element, component, region, layer or section. Thus, a first element, component, region, layer or section as described under could be termed a second element, component, region, layer or section, without departing from the spirit and scope of the present disclosure.

When an embodiment may be implemented differently, functions or operations specified within a specific block may be performed in a different order from an order specified in a flowchart. For example, two consecutive blocks may actually be performed substantially simultaneously, or the blocks may be performed in a reverse order depending on related functions or operations.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is separate explicit description thereof.

It will be understood that when an element or layer is referred to as being “connected to”, or “combined to” another element or layer, it may be directly on, connected to, or combined to the other element or layer, or one or more intervening elements or layers may be present. In addition, it will also be understood that when an element or layer is referred to as being “between” two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, “embodiments,” “examples,” “aspects”, and the like should not be construed such that any aspect or design as described is superior to or advantageous over other aspects or designs.

Further, the term ‘or’ means ‘inclusive or’ rather than ‘exclusive or’. That is, unless otherwise stated or clear from the context, the expression that ‘x uses a or b’ means any one of natural inclusive permutations.

The terms used in the description as set forth below have been selected as being general and universal in the related technical field. However, there may be other terms than the terms depending on the development and/or change of technology, convention, preference of technicians, etc. Therefore, the terms used in the description as set forth below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description period. Therefore, the terms used in the description as set forth below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B via another node unless a phrase ‘immediately transferred’ or ‘directly transferred’ is used.

Throughout the present disclosure, “A and/or B” means A, B, or A and B, unless otherwise specified, and “C to D” means C inclusive to D inclusive unless otherwise specified.

“At least one” should be understood to include any combination of one or more of listed components. For example, at least one of first, second, and third components means not only a first, second, or third component, but also all combinations of two or more of the first, second, and third components.

Hereinafter, a pixel circuit and a micro-LED display device including the same according to some embodiments will be described.

FIG. 1 is a schematic plan view of a micro-LED display device with a plurality of sub-pixels according to an embodiment of the present disclosure.

Referring to FIG. 1, a micro-LED display device 100 according to an embodiment of the present disclosure includes a display panel 110 in which a display area AA and a non-display area NA are defined.

A unit pixel in a front surface of display panel 110 may be composed of a plurality of sub-pixels SP. In general, the unit pixel may include sub-pixels SP that respectively emit light beams of red, blue, and green colors. However, embodiments of the present disclosure are not limited thereto. The unit pixel may further include a sub-pixel that emits light of white, etc.

The display panel 110 may include a thin-film transistor array substrate. The substrate may be made of glass or plastic, or may be formed by bonding two or more substrates or may be composed of two or more layers. The non-display area NA may be defined as an area of the display panel 110 excluding the display area AA, and may have a relatively very narrow width and may be defined as a bezel area.

Each of a plurality of unit pixels is disposed in the display area AA. In this regard, the plurality of unit pixels may be arranged in the display area AA in a first reference pixel pitch preset along an X-axis direction (or a row direction) and a second reference pixel pitch preset along a Y-axis direction (or a column direction). The first reference pixel pitch may be defined as a distance between exact centers of adjacent unit pixels in the X-axis direction. In a similar manner to the first reference pixel pitch, the second reference pixel pitch may be defined as a distance between exact centers of adjacent unit pixels in the Y-axis direction.

The sub-pixels SP constituting the unit pixel may also be arranged in the display area AA in a first reference sub-pixel pitch and a second reference sub-pixel pitch. The first reference sub-pixel pitch may be defined as a distance between exact centers of adjacent sub-pixels in the X-axis direction. The second reference sub-pixel pitch may be defined as a distance between exact centers of adjacent sub-pixels in the Y-axis direction.

A width of the non-display area NA of the micro-LED display device 100 may be smaller than the reference pixel pitch or the reference sub-pixel pitch as described above. A multi-screen display device may be formed by arranging the micro-LED display devices 100, each micro-LED display device having the non-display area NA of a length equal to or smaller than the refence pixel pitch or the reference sub-pixel pitch. Since the length of the non-display area NA is smaller than the reference pixel pitch or sub-pixel pitch, the multi-screen display device with substantially no bezel area may be implemented.

Figure 2:
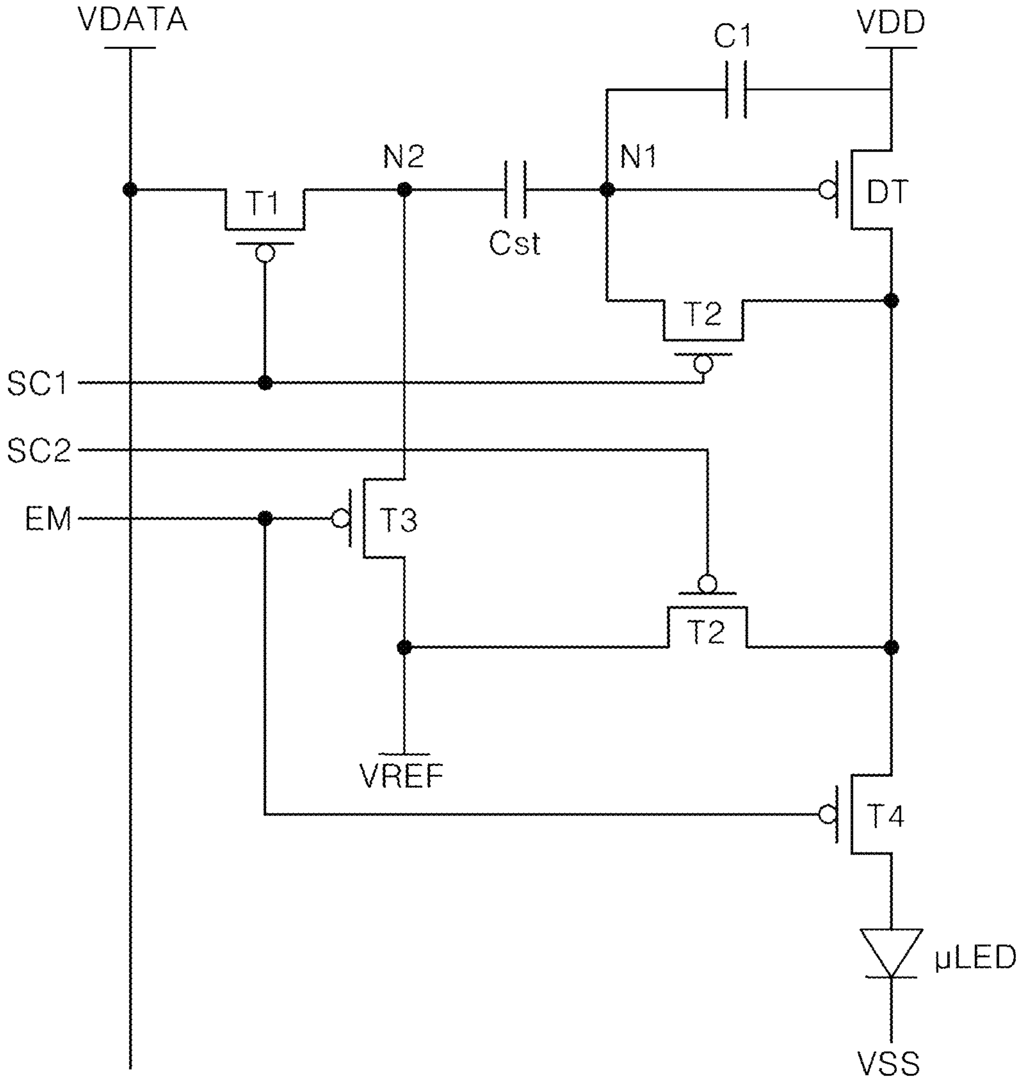
FIG. 2 shows a pixel circuit according to a first embodiment of the present disclosure.

FIG. 2 shows a pixel circuit with a common anode structure according to a first embodiment of the present disclosure.

Referring to FIG. 1 and FIG. 2, a configuration and a circuit structure of the sub-pixel SP which constitutes the unit pixel of the micro-LED display device 100 will be described. Pixel signal lines supply necessary signals to each of the plurality of sub-pixels SP. The pixel signal lines include a plurality of gate lines GL, a plurality of data lines DL, and a plurality of power lines. The plurality of power lines may include a power line that supplies power voltage VDD to the sub-pixel and a power line that supplies ground voltage VSS to the sub-pixel.

The gate line GL may include a first gate line and a second gate line. A first scan signal SC1 may be applied to the first gate line, and a second scan signal SC2 may be applied to the second gate line. Data voltage VDATA may be applied to the data line DL.

The plurality of gate lines GL extend in an elongate manner along a first horizontal axis direction X of the display panel 110 and are arranged so as to be spaced from each other by an equal spacing along the second horizontal axis direction Y. The plurality of data lines DL extend so as to intersect the plurality of gate line GL, and extend in an elongate manner along the second horizontal axis direction Y of the display panel 110, and are arranged so as to be spaced from each other by an equal spacing along the first horizontal axis direction X.

Each of the plurality of sub-pixels SP is disposed in a sub-pixel area defined by the gate line GL and the data line DL. Each of the plurality of sub-pixels SP may be defined as a minimum unit area where light is actually emitted.

At least three sub-pixels SP adjacent to each other may constitute one unit pixel for color display. For example, one unit pixel may include red, green, and blue sub-pixels SP adjacent to each other along the first horizontal axis direction X, and may further include a white sub-pixel SP to improve luminance.

Each of the plurality of sub-pixels SP according to the first embodiment includes a driving circuit and a micro-LED element μLED.

Cathode electrodes of the micro-LED elements μLED are commonly connected to ground voltage (or low-potential voltage) VSS, and an anode electrode thereof is connected to a driving transistor DT of the driving circuit. The micro-LED element μLED is disposed in each of the plurality of sub-pixels SP. This micro-LED element μLED is electrically connected to the driving circuit of the corresponding sub-pixel SP and the power line, and emits light based on current flowing in a direction from the power supply voltage (or high potential voltage VDD) to the ground voltage VSS via the driving transistor DT.

The micro-LED element μLED may be a light-emitting element or a light-emitting diode chip that emits one of red light, green light, blue light, and white light.

The driving circuit is disposed in a circuit area defined in each sub-pixel SP and is connected to the gate line GL, the data line DL, and the power line adjacent thereto. This driving circuit controls the current flowing in the micro-LED element μLED based on the data voltage from the data line DL, under the power voltage VDD supplied from the power line, in response to the scan signal from the gate line GL.

The driving circuit includes a first transistor T1, a second transistor T2, a third transistor T3, a fourth transistor T4, a fifth transistor T5, a driving transistor DT, a storage capacitor Cst, and a capacitor C1. An example in which each of the first transistor T1, the second transistor T2, the third transistor T3, the fourth transistor T4, the fifth transistor T5, and the driving transistor DT is embodied as a thin-film transistor and as a PMOS transistor is described. However, embodiments of the present disclosure are not limited thereto, and at least one of the first transistor T1, the second transistor T2, the third transistor T3, the fourth transistor T4, the fifth transistor T5, and the driving transistor DT may be embodied as an NMOS or PMOS transistor.

The first transistor T1 is connected to and disposed between the data voltage VDATA and the storage capacitor Cst, and transfers the data voltage VDATA to the storage capacitor Cst in response to the first scan signal SC1.

The second transistor T2 is connected to and disposed between a gate electrode and a drain electrode of the driving transistor DT, and connects the gate electrode and the drain electrode of the driving transistor DT to each other in response to the first scan signal SC1. The gate electrode of the driving transistor DT corresponds to a first node N1.

The third transistor T3 is connected to and disposed between a reference voltage VREF and a second node N2, and transmits the reference voltage VREF to the second node N2 in response to a light-emission signal EM. In this regard, the second node N2 corresponds to a node between the first transistor T1 and the storage capacitor Cst.

The fourth transistor T4 is connected to and disposed between the driving transistor DT and the micro-LED element μLED. The fourth transistor T4 is turned on in response to the light-emission signal EM so as to activate a current path of the driving current to the driving transistor DT.

The fifth transistor T5 is connected to and disposed between the reference voltage VREF and the drain electrode of the driving transistor DT, and transfers the reference voltage VREF to the drain electrode of the driving transistor DT in response to the second scan signal SC2.

The driving transistor DT is connected to and disposed between the power voltage VDD and the fourth transistor T4, and controls an amount of the driving current flowing in the micro-LED element μLED based on the data voltage VDATA sampled by the storage capacitor Cst.

The storage capacitor Cst is connected to and disposed between the first transistor T1 and the first node N1 corresponding to the gate electrode of the driving transistor DT, and samples the data voltage VDATA transmitted from the first transistor T1.

The first capacitor C1 is connected to and disposed between the gate electrode and a source electrode of the driving transistor DT. An output of the driving transistor DT may be stabilized by the first capacitor C1.

However, in the pixel circuit according to the first embodiment, the reference voltage VREF level may vary due to leakage current during a period for which an enable period of the first scan signal SC1 and an enable period of the second scan signal SC2 overlap each other. The variation in the reference voltage VREF level due to the leakage current may cause a decrease in luminance uniformity.

Figure 3:
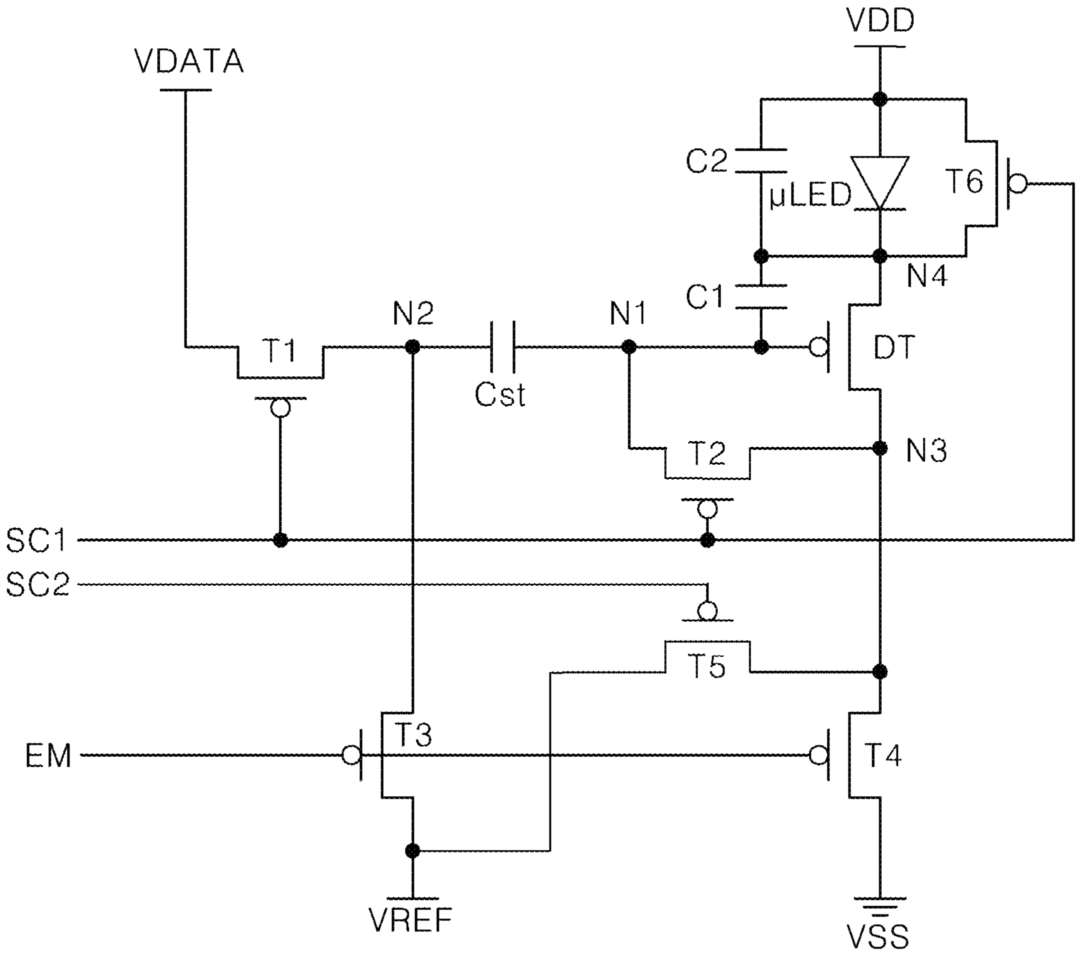
FIG. 3 shows a pixel circuit according to a second embodiment of the present disclosure.

FIG. 3 shows a pixel circuit with a common anode structure according to a second embodiment of the present disclosure.

Referring to FIG. 1 and FIG. 3, each of the plurality of sub-pixels SP according to the second embodiment includes the driving circuit and the micro-LED element μLED.

The micro-LED element μLED has a common anode electrode connected to the power voltage VDD, and a cathode electrode connected to the driving transistor DT of the driving circuit. The micro-LED element μLED is disposed in each of the plurality of sub-pixels SP. This micro-LED element μLED is electrically connected to the driving circuit of a corresponding sub-pixel SP and the power line, and emits light based on the current flowing in a direction from the power supply voltage VDD to the ground voltage VSS through the driving transistor DT.

The driving circuit is disposed in the circuit area defined in each sub-pixel SP and is connected to the gate line GL, the data line DL, and the power line adjacent thereto. This driving circuit controls the current flowing in the micro-LED element μLED based on the data voltage from the data line DL, under the power voltage VDD supplied from the power line, in response to the scan signal from the gate line GL.

The driving circuit includes a first transistor T1, a second transistor T2, a third transistor T3, a fourth transistor T4, a fifth transistor T5, a sixth transistor T6, a driving transistor DT, a storage capacitor Cst, a first capacitor C1, and a second capacitor C2. An example in which each of the first transistor T1, the second transistor T2, the third transistor T3, the fourth transistor T4, the fifth transistor T5, the sixth transistor T6, and the driving transistor DT is embodied as a thin-film transistor and as a PMOS transistor is described. However, embodiments of the present disclosure are not limited thereto, and at least one of the first transistor T1, the second transistor T2, the third transistor T3, the fourth transistor T4, the fifth transistor T5, the sixth transistor T6, and the driving transistor DT may be embodied as an NMOS or PMOS transistor.

The first transistor T1 is connected to and disposed between the data voltage VDATA and the storage capacitor Cst, and transfers the data voltage VDATA to the storage capacitor Cst in response to the first scan signal SC1.

The second transistor T2 is connected to and disposed between the gate electrode and the drain electrode of the driving transistor DT, and connects the gate electrode and the drain electrode to each other in response to the first scan signal SC1. The gate electrode of the driving transistor DT corresponds to a first node N1, the drain electrode of the driving transistor DT corresponds to a third node N3, and the source electrode of the driving transistor DT corresponds to a fourth node N4.

The third transistor T3 is connected to and disposed between the reference voltage VREF and the second node N2, and transmits the reference voltage VREF to the second node N2 in response to the light-emission signal EM. In this regard, the second node N2 corresponds to a node between the first transistor T1 and the storage capacitor Cst.

The fourth transistor T4 is connected to and disposed between the driving transistor DT and the ground voltage VSS. The fourth transistor T4 is turned on in response to the light-emission signal EM so as to activate a current path of the driving current to the driving transistor DT.

The fifth transistor T5 is connected to and disposed between the reference voltage VREF and the third node N3, and transmits the reference voltage VREF to the third node N3 in response to the second scan signal SC2. In this regard, the third node N3 is a node corresponding to the drain electrode of the driving transistor DT.

The sixth transistor T6 is connected in parallel with the micro-LED element μLED, and transmits the power voltage VDD to the fourth node N4 corresponding to the source electrode of the driving transistor DT in response to the first scan signal SC1.

The driving transistor DT is connected to and disposed between the micro-LED element μLED and the fourth transistor T4, and controls the amount of the driving current flowing in the micro-LED element μLED based on the data voltage VDATA sampled by the storage capacitor Cst.

The storage capacitor Cst is connected to and disposed between the first transistor T1 and the first node N1 corresponding to the gate electrode of the driving transistor DT, and samples the data voltage VDATA transmitted from the first transistor T1.

The first capacitor C1 is connected to and disposed between the gate electrode and the source electrode of the driving transistor DT. The second capacitor C2 is connected in parallel with the micro-LED element μLED and is connected in series with the first capacitor C1. The output of the driving transistor DT may be stabilized by the first capacitor C1 and the second capacitor C2.

Figure 4:
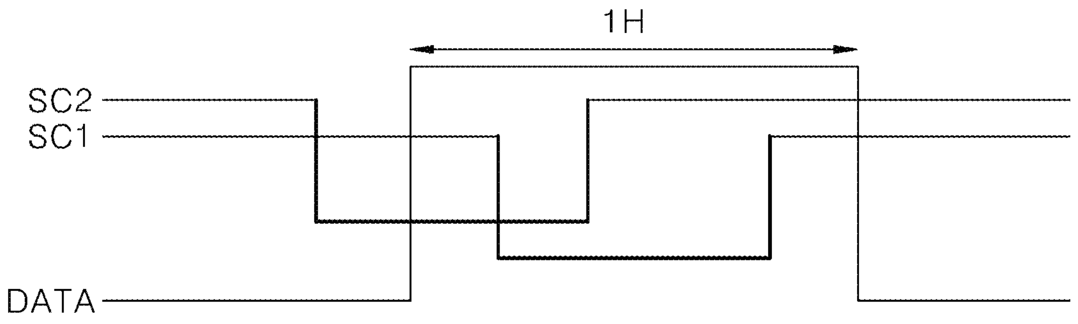
FIG. 4 is a timing diagram of the pixel circuit as shown in FIG. 3.
Figure 5:
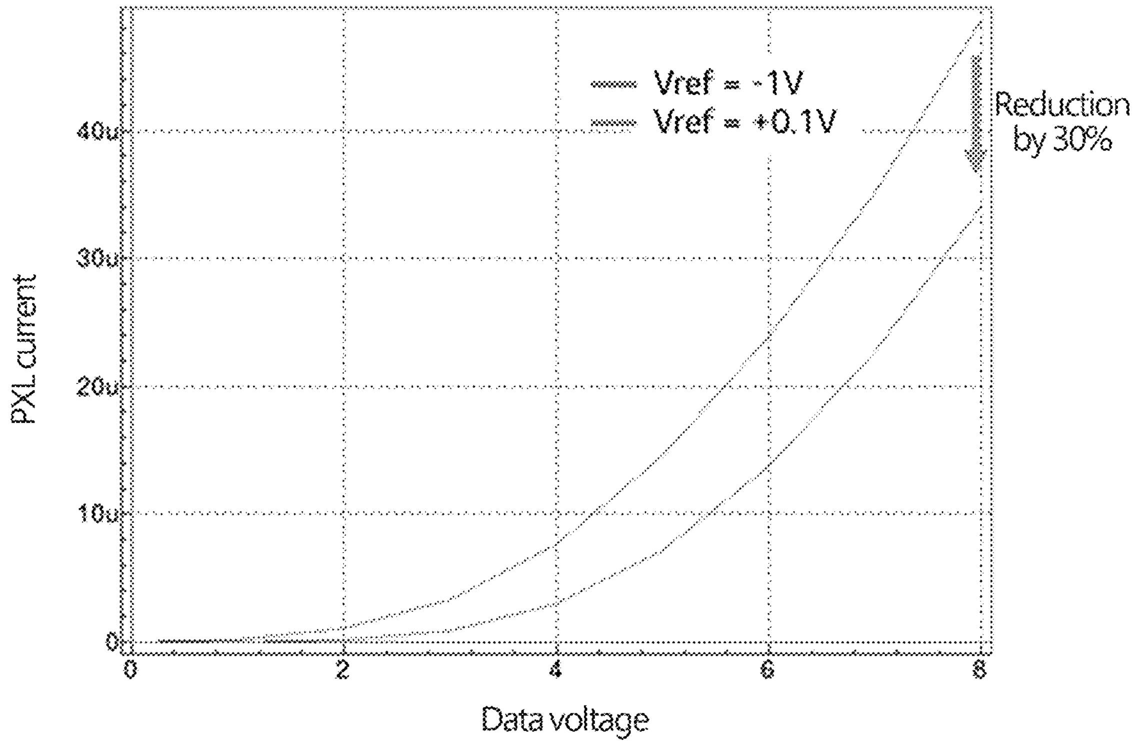
FIG. 5 is a current measurement graph of the pixel circuit as shown in FIG. 3.

FIG. 4 is a timing diagram of the pixel circuit as shown in FIG. 3. FIG. 5 is a current measurement graph of the pixel circuit as shown in FIG. 3.

Referring to FIG. 4, the enable period of the first scan signal SC1 and the enable period of the second scan signal SC2 partially overlap each other. The pixel circuit is configured such that the fifth transistor T5 operates in response to the second scan signal SC2, and the second transistor T2 and the sixth transistor T6 operate in response to the first scan signal SC1 to reset the first node N1 corresponding to the gate electrode of the driving transistor DT.

In this pixel circuit, the reference voltage VREF level may vary due to leakage current for a period for which the enable period of the first scan signal SC1 and the enable period of the second scan signal SC2 overlap each other. The variation in the reference voltage VREF level due to the leakage current may cause a decrease in luminance uniformity.

Furthermore, the reference voltages VREF respectively applied to the different pixels adjacent to the different power lines may be different from each other. For example, there may be a difference between the reference voltage VREF of the pixel adjacent to the power line to which the power voltage VDD is applied and the reference voltage VREF of the pixel adjacent to the power line to which the ground voltage VSS is applied. This may cause a decrease in luminance uniformity.

The present disclosure seeks to provide a pixel circuit that may output uniform driving current regardless of the process distribution of the micro-LED element and a micro-LED display device including the same.

Furthermore, the present disclosure seeks to provide a pixel circuit that may remove luminance unevenness and flicker problems by applying a direct internal compensation circuit to reduce the leakage current, and a micro-LED display device including the same.

Figure 6:
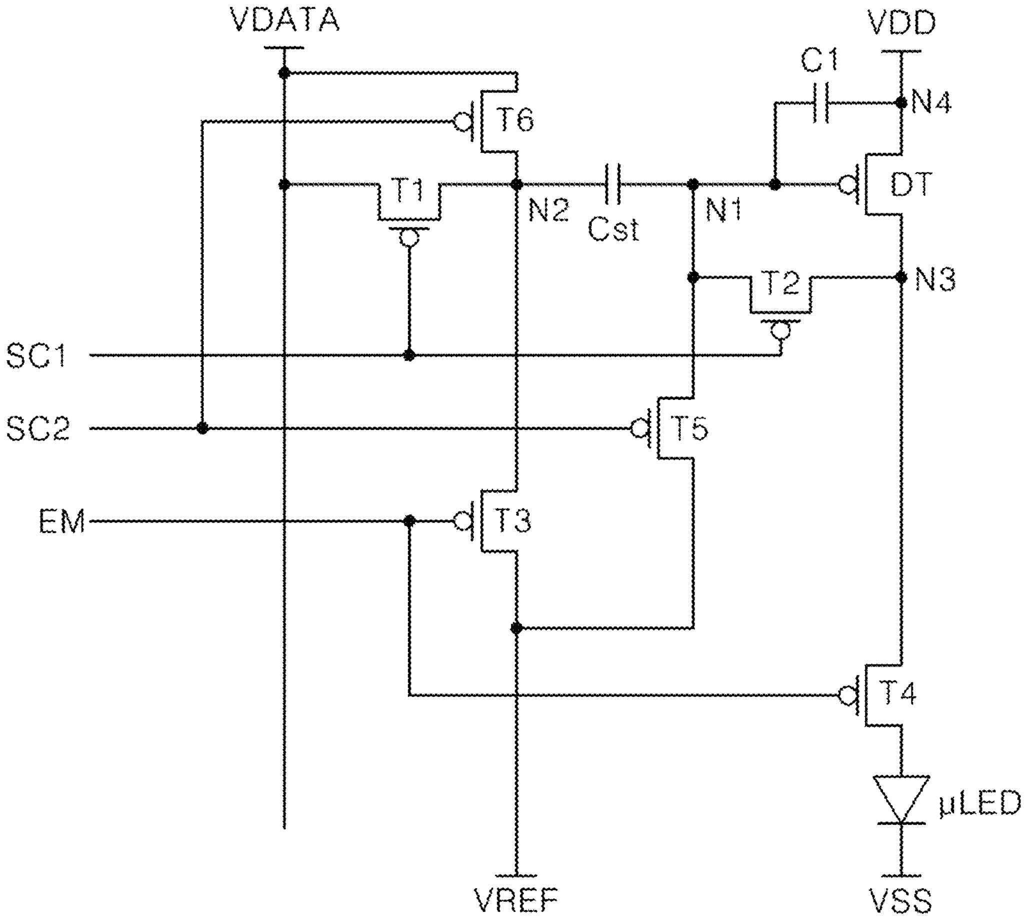
FIG. 6 shows a pixel circuit according to a third embodiment of the present disclosure.
Figure 7:
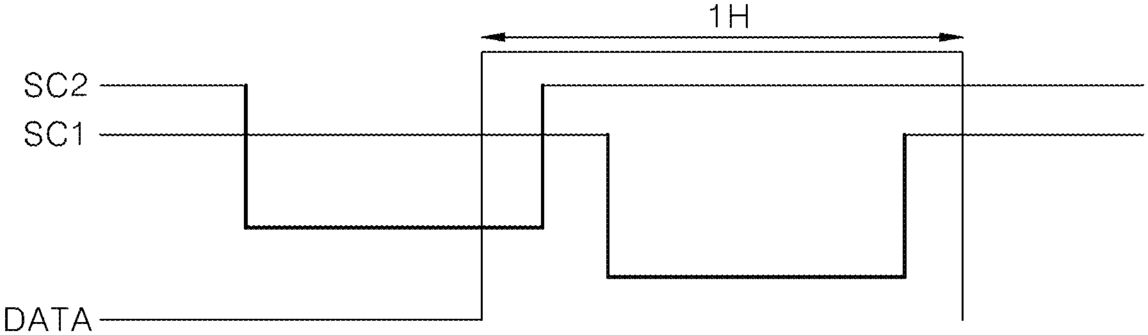
FIG. 7 is a timing diagram of a pixel circuit according to the third embodiment of the present disclosure.

FIG. 6 shows a pixel circuit with a common cathode structure according to a third embodiment of the present disclosure. FIG. 7 is a timing diagram of the pixel circuit as shown in FIG. 6.

Referring to FIGS. 6 and 7, the pixel circuit according to the third embodiment includes the micro-LED element μLED and the driving circuit.

The driving circuit includes a first transistor T1, a second transistor T2, a third transistor T3, a fourth transistor T4, a fifth transistor T5, a sixth transistor T6, a driving transistor DT, a storage capacitor Cst, and a stabilization capacitor C1. An example in which each of the first transistor T1, the second transistor T2, the third transistor T3, the fourth transistor T4, the fifth transistor T5, the sixth transistor T6, and the driving transistor DT is embodied as a thin-film transistor and as a PMOS transistor is described. However, embodiments of the present disclosure are not limited thereto, and at least one of the first transistor T1, the second transistor T2, the third transistor T3, the fourth transistor T4, the fifth transistor T5, the sixth transistor T6, and the driving transistor DT may be embodied as an NMOS or PMOS transistor. Furthermore, the NMOS transistor may be an oxide thin-film transistor, and the PMOS thin-film transistor may be a polycrystalline silicon thin-film transistor.

The micro-LED element μLED may include an anode electrode and a cathode electrode. The anode electrode of micro-LED element μLED is connected to the fourth transistor T4. The cathode electrodes of the micro-LED elements μLED are commonly connected to ground voltage (or low-potential voltage VSS). The micro-LED element μLED is disposed in each of the plurality of sub-pixels SP.

This micro-LED element μLED is electrically connected to the driving circuit of a corresponding sub-pixel SP and the power line, and emits light based on the current flowing in a direction from the power supply voltage (or high potential voltage VDD) to the ground voltage VSS through the driving transistor DT. The micro-LED element μLED may be a light-emitting element or a light-emitting diode chip that emits one of red light, green light, blue light, and white light. According to an embodiment, the color of the light emitted from the micro-LED element μLED is not limited to the above-described example.

The first transistor T1 is connected to and disposed between the data voltage VDATA and the storage capacitor Cst, and transfers the data voltage VDATA to the storage capacitor Cst in response to the first scan signal SC1.

The second transistor T2 is connected to and disposed between the gate electrode and the drain electrode of the driving transistor DT, and connects the gate electrode and the drain electrode of the driving transistor DT to each other in response to the first scan signal SC1. The gate electrode of the driving transistor DT corresponds to the first node N1, the drain electrode of the driving transistor DT corresponds to the third node N3, and the source electrode of the driving transistor DT corresponds to the fourth node N4.

The third transistor T3 is connected to and disposed between the reference voltage VREF and the second node N2, and transmits the reference voltage VREF to the second node N2 in response to the light-emission signal EM. In this regard, the second node N2 corresponds to the node between the first transistor T1 and the storage capacitor Cst.

The fourth transistor T4 is connected to and disposed between the drain electrode of the driving transistor DT and the anode electrode of the micro-LED element μLED. The fourth transistor T4 is turned on in response to the light-emission signal EM so as to activate a current path of the driving current to the driving transistor DT.

The fifth transistor T5 is connected to and disposed between the reference voltage VREF and the first node N1, and transmits the reference voltage VREF to the first node N1 in response to the second scan signal SC2. In this regard, the first node N1 is a node between the gate electrode of the driving transistor DT and one electrode of the storage capacitor Cst and a node corresponding to the gate electrode of the driving transistor DT. The fifth transistor T5 performs a function of resetting one electrode of the storage capacitor Cst to the reference voltage VREF in response to the second scan signal SC2.

The sixth transistor T6 is connected to and disposed between the data voltage VDATA and the second node N2, and transmits the data voltage VDATA to the second node N2 in response to the second scan signal SC2. In this regard, the second node N2 is a node between the first transistor T1 and the storage capacitor Cst and a node corresponding to the other electrode of the storage capacitor Cst. The sixth transistor T6 performs a function of resetting the other electrode of the storage capacitor Cst to the data voltage VDATA in response to the second scan signal SC2.

Accordingly, the fifth transistor T5 and the sixth transistor T6 operate in response to the same second scan signal SC2. The both opposing electrodes of the storage capacitor Cst may be simultaneously reset by the fifth transistor T5 and the sixth transistor T6 operating in response to the same second scan signal SC2.

The driving transistor DT is connected to and disposed between the power supply voltage VDD and the fourth transistor T4, and controls the amount of the driving current flowing through the micro-LED element μLED based on the voltage applied to the gate electrode thereof. The voltage applied to the gate electrode thereof may vary depending on the data voltage VDATA sampled by the storage capacitor Cst. Therefore, the driving transistor DT may control the amount of the driving current flowing through the micro-LED element μLED based on the data voltage VDATA.

The storage capacitor Cst is connected to and disposed between the first transistor T1 and the first node N1 corresponding to the gate electrode of the driving transistor DT, and samples the data voltage VDATA transmitted from the first transistor T1.

The first capacitor C1 is connected to and disposed between the gate electrode and the source electrode of the driving transistor DT. The output of the driving transistor DT may be stabilized by the first capacitor C1. The first capacitor C1 may be referred to as an output stabilization capacitor.

The pixel circuit according to one aspect of the present disclosure may include the micro-LED element μLED, the driving transistor DT that controls the driving current of the micro-LED element μLED, the storage capacitor Cst that samples the data voltage VDATA, and an internal compensation circuit that directly resets the first node N1 and the second node N2 respectively corresponding to both opposing electrodes of the storage capacitor Cst before the storage capacitor Cst samples the data voltage VDATA.

The cathode electrodes of the micro-LED elements μLED may be commonly connected to the ground voltage (or low-potential voltage VSS).

The internal compensation circuit may include a first reset transistor (or the fifth transistor T5) and a second reset transistor (or the sixth transistor T6). The first reset transistor T5 resets the first node N1 between the gate electrode of the driving transistor DT and one electrode of the storage capacitor Cst. The second reset transistor T6 resets the second node N2 between the first transistor T1 delivering the data voltage VDATA and the other electrode of the storage capacitor Cst.

In this regard, the first reset transistor T5 and the second reset transistor T6 may simultaneously reset the first node N1 and the second node N2, respectively, in response to the same second scan signal SC2. For example, the first reset transistor T5 may reset the first node N1 to the reference voltage VREF, and the second reset transistor T6 may reset the second node N2 to the data voltage VDATA. In this regard, the first scan signal SC1 and the second scan signal SC2 may be set so that the enable periods thereof do not overlap each other, as shown in FIG. 7.

The pixel circuit is configured such that the first reset transistor T5 and the second reset transistor T6 operate in response to the same second scan signal SC2 to directly reset the first node N1 and the second node N2 corresponding to both opposing electrodes of the storage capacitor Cst, respectively before the data voltage VDATA is sampled by the storage capacitor Cst. The pixel circuit has a structure in which the first scan signal SC1 and the second scan signal SC2 non-overlap each other to suppress the leakage of the reference voltage VREF, such that the luminance uniformity across the pixels may be improved.

Figure 8:
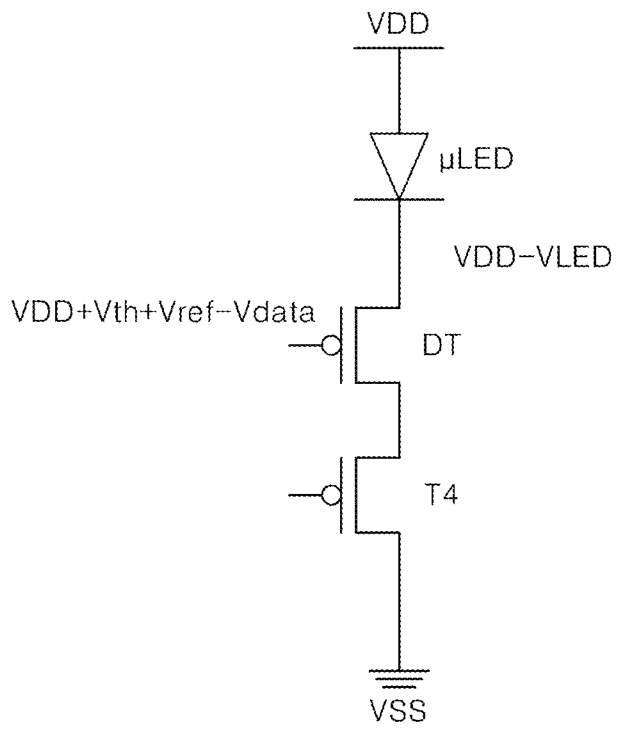
FIG. 8 shows a portion of a pixel circuit with a common anode structure in accordance with the present disclosure.
Figure 9:
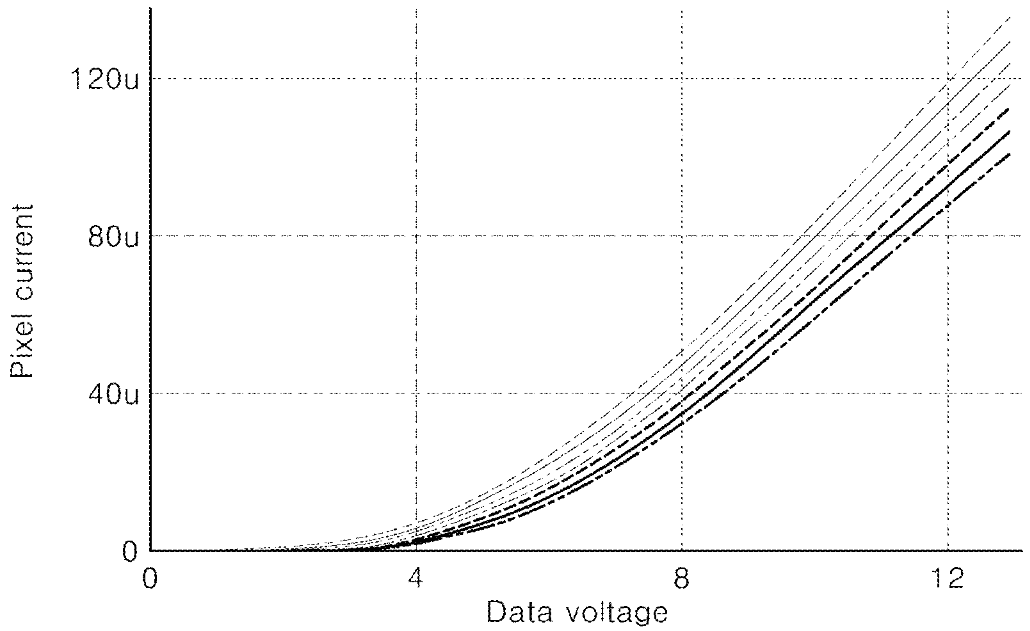
FIG. 9 shows a simulation result of a pixel circuit with a common anode structure in accordance with the present disclosure.

FIG. 8 shows a portion of a pixel circuit with a common anode structure in accordance with the present disclosure. FIG. 9 shows a simulation result of the pixel circuit with the common anode structure in accordance with the present disclosure.

As shown in FIG. 8, the driving transistor DT and the fourth transistor T4 between the power voltage VDD and the ground voltage VSS may constitute a current path of a driving current ILED. A magnitude of the driving current ILED is based on a level of the data voltage VDATA.

Equation 1

$$\begin{aligned} I_{LED} &= \frac{1}{2}\mu C_{ox}(V_{GS} - V_{th})^2 \\ &= \frac{1}{2}\mu C_{ox}\{(\cancel{V_{DD}} + \cancel{V_{th}} + V_{ref} - V_{Data}) - (\cancel{V_{DD}} - V_{LED}) - \cancel{V_{th}}\}^2 \\ &= \frac{1}{2}\mu C_{ox}(V_{Data} - V_{ref} - V_{LED})^2 \end{aligned}$$

In the pixel circuit with the common anode structure, a voltage drop VLED caused by the micro-LED affects the operation of the driving transistor DT, as shown in Equation 1. As shown in FIG. 9, the voltage drop caused by the micro-LED may have a greater impact on the pixel current as the data voltage increases.

Figure 10:
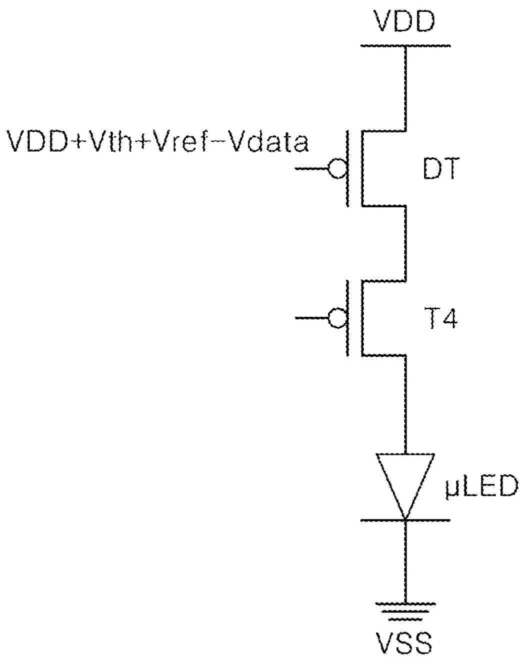
FIG. 10 shows a portion of a pixel circuit with a common cathode structure in accordance with the present disclosure.
Figure 11:
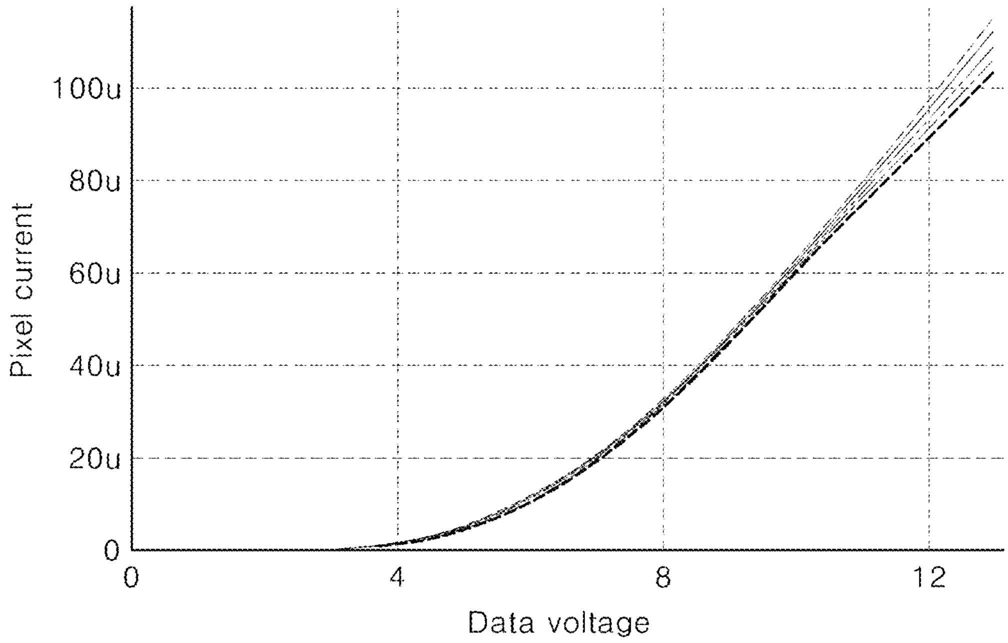
FIG. 11 shows a simulation result of a pixel circuit with a common cathode structure in accordance with the present disclosure.

FIG. 10 shows a portion of a pixel circuit with a common cathode structure in accordance with the present disclosure. FIG. 11 shows a simulation result of the pixel circuit with the common cathode structure in accordance with the present disclosure.

As shown in FIG. 10, the driving transistor DT and the fourth transistor T4 between the power voltage VDD and the ground voltage VSS may constitute a current path of the driving current ILED. A magnitude of the driving current ILED is based on the level of the data voltage VDATA.

Equation 2

$$\begin{aligned} I_{LED} &= \frac{1}{2}\mu C_{ox}(V_{GS} - V_{th})^2 \\ &= \frac{1}{2}\mu C_{ox}\{(\cancel{V_{DD}} + \cancel{V_{th}} + V_{ref} - V_{Data}) - \cancel{V_{DD}} - \cancel{V_{th}}\}^2 \\ &= \frac{1}{2}\mu C_{ox}(V_{Data} - V_{ref})^2 \end{aligned}$$

In the pixel circuit with the common cathode structure, the voltage drop caused by the micro-LED does not affect the operation of the driving transistor DT, as shown in Equation 2. Thus, the pixel circuit may output a constant current regardless of the process distribution of the micro-LED. In this regard, the process distribution may be defined as a difference between characteristics of respective micro-LEDs of the pixels caused by the micro-LED process environment.

In one example, the characteristics of the micro-LED may include threshold voltage, electron mobility, etc.

A pixel circuit and a display device according to some aspects and embodiments of the present disclosure may be described as follows:

A first aspect of the present disclosure provides a pixel circuit comprising: a micro-LED; a driving transistor configured to control a driving current of the micro-LED; a storage capacitor configured to sample a data voltage, wherein a magnitude of the driving current is based on the data voltage; and an internal compensation circuit configured to directly reset a first node and a second node respectively corresponding to both opposing electrodes of the storage capacitor before the storage capacitor samples the data voltage.

In accordance with some embodiments of the first aspect of the present disclosure, cathode electrodes of the micro-LEDs are commonly connected to a low-potential voltage.

In accordance with some embodiments of the first aspect of the present disclosure, the internal compensation circuit includes: a first reset transistor configured to reset the first node between a gate electrode of the driving transistor and one of the both opposing electrodes of the storage capacitor; and a second reset transistor configured to reset the second node between a first transistor configured to transmit the data voltage and the other of the both opposing electrodes of the storage capacitor.

In accordance with some embodiments of the first aspect of the present disclosure, the first transistor is configured to transmit the data voltage to the storage capacitor in response to a first scan signal.

In accordance with some embodiments of the first aspect of the present disclosure, the first reset transistor and the second reset transistor are configured to reset the first node and the second node, respectively, in response to a same second scan signal.

In accordance with some embodiments of the first aspect of the present disclosure, an enable period of the first scan signal and an enable period of the second scan signal non-overlap each other.

In accordance with some embodiments of the first aspect of the present disclosure, the first reset transistor is configured to reset the first node to a reference voltage.

In accordance with some embodiments of the first aspect of the present disclosure, the second reset transistor is configured to reset the second node to the data voltage.

In accordance with some embodiments of the first aspect of the present disclosure, the pixel circuit further comprises: a first transistor configured to transmit the data voltage to the storage capacitor in response to a first scan signal; and a second transistor configured to connect a gate electrode and a drain electrode of the driving transistor to each other in response to the first scan signal.

In accordance with some embodiments of the first aspect of the present disclosure, the pixel circuit further comprises: a third transistor configured to transmit a reference voltage to the second node in response to a light-emission signal; and a fourth transistor configured to be turned on in response to the light-emission signal so as to activate a current path of the driving current to the driving transistor.

In accordance with some embodiments of the first aspect of the present disclosure, the pixel circuit further comprises a stabilization capacitor connected to and disposed between a source electrode and a gate electrode of the driving transistor and configured to stabilize an output of the driving transistor.

A second aspect of the present disclosure provides a micro-LED display device comprising: at least one sub-pixel, wherein each of the at least one sub-pixel includes: a micro-LED; a driving transistor configured to control a driving current of the micro-LED; a storage capacitor configured to sample a data voltage, wherein a magnitude of the driving current is based on the data voltage; a first transistor configured to transmit the data voltage to the storage capacitor in response to a first scan signal; a second transistor configured to connect a gate electrode and a drain electrode of the driving transistor in response to the first scan signal; a first reset transistor configured to reset a first node between the gate electrode of the driving transistor and one of both opposing electrodes of the storage capacitor in response to a second scan signal; and a second reset transistor configured to reset a second node between the first transistor and the other of the both opposing electrodes of the storage capacitor in response to the second scan signal.

In accordance with some embodiments of the second aspect of the present disclosure, cathode electrodes of the micro-LEDs are commonly connected to a low-potential voltage.

In accordance with some embodiments of the second aspect of the present disclosure, an enable period of the first scan signal and an enable period of the second scan signal non-overlap each other.

In accordance with some embodiments of the second aspect of the present disclosure, the first reset transistor is configured to reset the first node to the reference voltage, wherein the second reset transistor is configured to reset the second node to the data voltage.

In accordance with some embodiments of the second aspect of the present disclosure, each of the at least one sub-pixel further comprises: a third transistor configured to transmit a reference voltage to the second node in response to a light-emission signal; and a fourth transistor configured to be turned on in response to the light-emission signal so as to activate a current path of the driving current to the driving transistor.

In accordance with some embodiments of the second aspect of the present disclosure, each of the at least one sub-pixel further comprises a stabilization capacitor connected to and disposed between a source electrode and the gate electrode of the driving transistor and configured to stabilize an output of the driving transistor.

A third aspect of the present disclosure provides a micro-LED display device comprising: a micro-LED configured to emit light based on a driving current; a driving transistor configured to receive a power voltage and to control the driving current; a storage capacitor having one electrode corresponding to a first node and connected to a gate electrode of the driving transistor, and the other electrode corresponding to a second node and connected to a first transistor configured to transmit a data voltage, wherein the storage capacitor is configured to sample the data voltage; the first transistor configured to transmit the data voltage to the storage capacitor in response to a first scan signal; a second transistor configured to connect the gate electrode and a drain electrode of the driving transistor to each other in response to the first scan signal; a third transistor configured to transmit a reference voltage to the second node in response to a light-emission signal; a fourth transistor connected to and disposed between the driving transistor and the micro-LED, and configured to be turned on in response to the light-emission signal so as to activate a current path of the driving current to the driving transistor; a fifth transistor configured to transmit the reference voltage to the first node in response to a second scan signal; a sixth transistor configured to transmit the data voltage to the second node in response to the second scan signal; and a stabilization capacitor connected to and disposed between a source electrode and the gate electrode of the driving transistor.

In accordance with some embodiments of the third aspect of the present disclosure, the fifth transistor and the sixth transistor are configured to directly reset the first node to the reference voltage and directly reset the second node to the data voltage, respectively, in response to the same second scan signal.

In accordance with some embodiments of the third aspect of the present disclosure, cathode electrodes of the micro-LEDs are commonly connected to a ground voltage, wherein an enable period of the first scan signal and an enable period of the second scan signal non-overlap each other.

A fourth aspect of the present disclosure provides pixel circuit comprising: a micro-LED; a driving transistor configured to control a driving current of the micro-LED; a storage capacitor configured to sample a data voltage, wherein a magnitude of the driving current is based on the data voltage; a first transistor configured to transmit the data voltage to the storage capacitor in response to a first scan signal; and an internal compensation circuit configured to simultaneously reset both opposing electrodes of the storage capacitor in response to a second scan signal, wherein an enable period of the first scan signal and an enable period of the second scan signal non-overlap each other.

According to embodiments of the present disclosure, a uniform driving current may be output regardless of the process distribution of the micro-LED.

Furthermore, according to embodiments of the present disclosure, the luminance unevenness and flicker problems may be removed by applying the direct reset compensation circuit to reduce the leakage current.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pixel circuit, comprising:

a micro-LED;

a driving transistor configured to control a driving current of the micro-LED;

a storage capacitor configured to sample a data voltage, wherein a magnitude of the driving current is based on the data voltage; and an internal compensation circuit configured to directly reset a first node and a second node respectively corresponding to two opposing electrodes of the storage capacitor before the storage capacitor samples the data voltage, wherein the internal compensation circuit includes:

a first reset transistor configured to reset the first node between a gate electrode of the driving transistor and one of the two opposing electrodes of the storage capacitor; and a second reset transistor configured to reset the second node between a first transistor configured to transmit the data voltage and another one of the two opposing electrodes of the storage capacitor, wherein the first reset transistor is configured to reset the first node to a reference voltage, and the second reset transistor is configured to reset the second node to the data voltage.

2. The pixel circuit of claim 1, comprising a plurality of micro-LEDs including the micro-LED, wherein cathode electrodes of the micro-LEDs are commonly connected to a low-potential voltage.

3. The pixel circuit of claim 1, wherein the internal compensation circuit includes:

a first reset transistor configured to reset the first node between a gate electrode of the driving transistor and one of the both opposing electrodes of the storage capacitor; and a second reset transistor configured to reset the second node between a first transistor configured to transmit the data voltage and the other of the both opposing electrodes of the storage capacitor.

4. The pixel circuit of claim 3, wherein the first transistor is configured to transmit the data voltage to the storage capacitor in response to a first scan signal.

5. The pixel circuit of claim 4, wherein the first reset transistor and the second reset transistor are configured to reset the first node and the second node, respectively, in response to a same second scan signal.

6. The pixel circuit of claim 5, wherein an enable period of the first scan signal and an enable period of the second scan signal do not overlap each other.

7. The pixel circuit of claim 1, further comprising:

a first transistor configured to transmit the data voltage to the storage capacitor in response to a first scan signal; and a second transistor configured to connect a gate electrode and a drain electrode of the driving transistor to each other in response to the first scan signal.

8. The pixel circuit of claim 1, further comprising:

a third transistor configured to transmit a reference voltage to the second node in response to a light-emission signal; and a fourth transistor configured to be turned on in response to the light-emission signal so as to activate a current path of the driving current to the driving transistor.

9. The pixel circuit of claim 8, further comprising a stabilization capacitor connected to and disposed between a source electrode and a gate electrode of the driving transistor and configured to stabilize an output of the driving transistor.

10. A micro-LED display device, comprising:

at least one sub-pixel, wherein each of the at least one sub-pixel includes:

a micro-LED;

a driving transistor configured to control a driving current of the micro-LED;

a storage capacitor configured to sample a data voltage, wherein a magnitude of the driving current is based on the data voltage;

a first transistor configured to transmit the data voltage to the storage capacitor in response to a first scan signal;

a second transistor configured to connect a gate electrode and a drain electrode of the driving transistor in response to the first scan signal;

a first reset transistor configured to reset a first node between the gate electrode of the driving transistor and one of two opposing electrodes of the storage capacitor in response to a second scan signal; and a second reset transistor configured to reset a second node between the first transistor and another one of the two opposing electrodes of the storage capacitor in response to the second scan signal, wherein the first reset transistor is configured to reset the first node to the reference voltage, and the second reset transistor is configured to reset the second node to the data voltage.

11. The display device of claim 10, comprising a plurality of micro-LEDs including the micro-LED, wherein cathode electrodes of the micro-LEDs are commonly connected to a low-potential voltage.

12. The display device of claim 10, wherein an enable period of the first scan signal and an enable period of the second scan signal do not overlap each other.

13. The display device of claim 10, wherein each of the at least one sub-pixel further comprises:

a third transistor configured to transmit a reference voltage to the second node in response to a light-emission signal; and a fourth transistor configured to be turned on in response to the light-emission signal so as to activate a current path of the driving current to the driving transistor.

14. The display device of claim 13, wherein each of the at least one sub-pixel further comprises a stabilization capacitor connected to and disposed between a source electrode and the gate electrode of the driving transistor and configured to stabilize an output of the driving transistor.

15. A micro-LED display device, comprising:

a micro-LED configured to emit light based on a driving current;

a driving transistor configured to receive a power voltage and to control the driving current;

a storage capacitor having a first electrode corresponding to a first node and connected to a gate electrode of the driving transistor, and a second electrode corresponding to a second node and connected to a first transistor configured to transmit a data voltage, wherein the storage capacitor is configured to sample the data voltage;

the first transistor configured to transmit the data voltage to the storage capacitor in response to a first scan signal;

a second transistor configured to connect the gate electrode and a drain electrode of the driving transistor to each other in response to the first scan signal;

a third transistor configured to transmit a reference voltage to the second node in response to a light-emission signal;

a fourth transistor connected to and disposed between the driving transistor and the micro-LED, and configured to be turned on in response to the light-emission signal so as to activate a current path of the driving current to the driving transistor;

a fifth transistor configured to transmit the reference voltage to the first node in response to a second scan signal;

a sixth transistor configured to transmit the data voltage to the second node in response to the second scan signal; and a stabilization capacitor connected to and disposed between a source electrode and the gate electrode of the driving transistor.

16. The display device of claim 15, wherein the fifth transistor and the sixth transistor are configured to directly reset the first node to the reference voltage and directly reset the second node to the data voltage, respectively, in response to the same second scan signal.

17. The display device of claim 15, wherein cathode electrodes of the micro-LEDs are commonly connected to a ground voltage, wherein an enable period of the first scan signal and an enable period of the second scan signal non-overlap each other.

18. A pixel circuit, comprising:

a micro-LED;

a driving transistor configured to control a driving current of the micro-LED;

a storage capacitor configured to sample a data voltage, wherein a magnitude of the driving current is based on the data voltage;

a first transistor configured to transmit the data voltage to the storage capacitor in response to a first scan signal; and an internal compensation circuit configured to simultaneously reset both opposing electrodes of the storage capacitor in response to a second scan signal, wherein an enable period of the first scan signal and an enable period of the second scan signal do not overlap each other, and wherein the internal compensation circuit includes:

a first reset transistor configured to reset the first node between a gate electrode of the driving transistor and one of the two opposing electrodes of the storage capacitor; and a second reset transistor configured to reset the second node between a first transistor configured to transmit the data voltage and another one of the two opposing electrodes of the storage capacitor, wherein the first reset transistor is configured to reset the first node to a reference voltage, and the second reset transistor is configured to reset the second node to the data voltage.

* * * * *